May 6, 1958 J. M. CONSTABLE 2,833,931
HIGH RANGE RADIATION MEASURING CIRCUIT
Filed Oct. 31, 1955
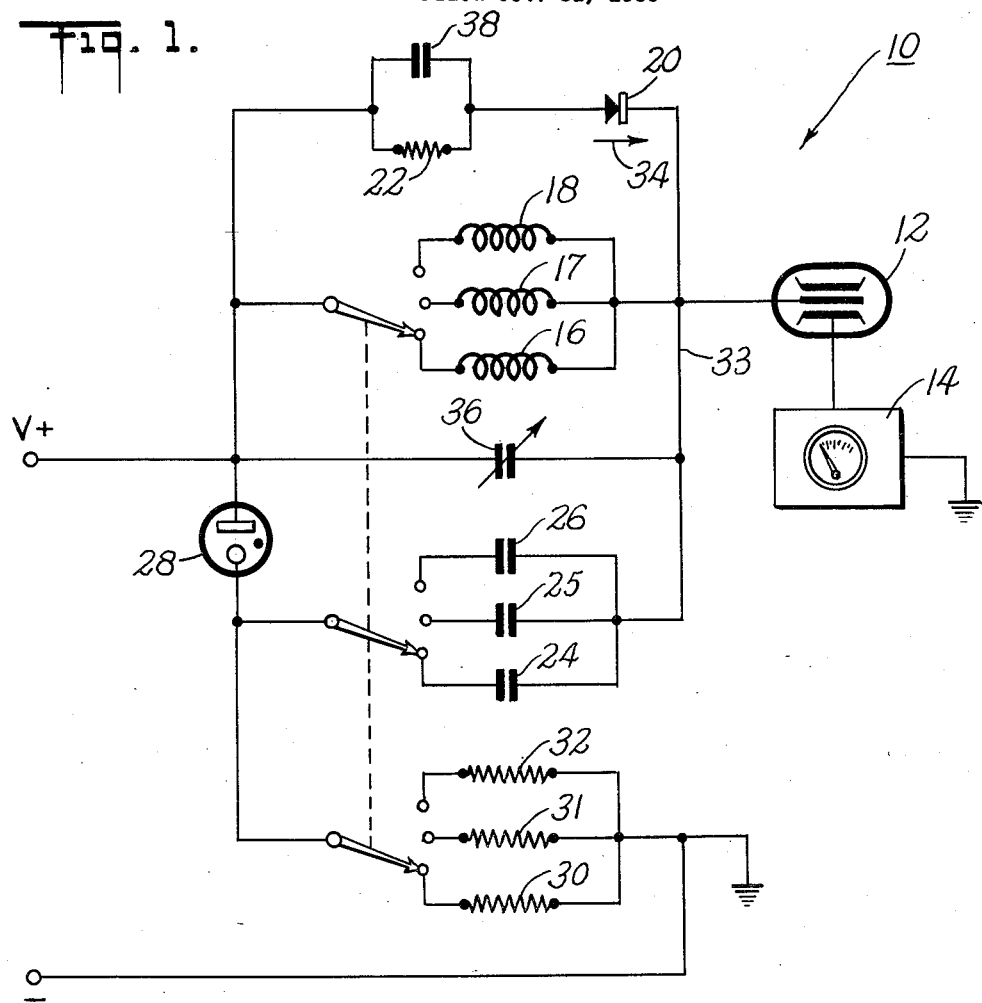
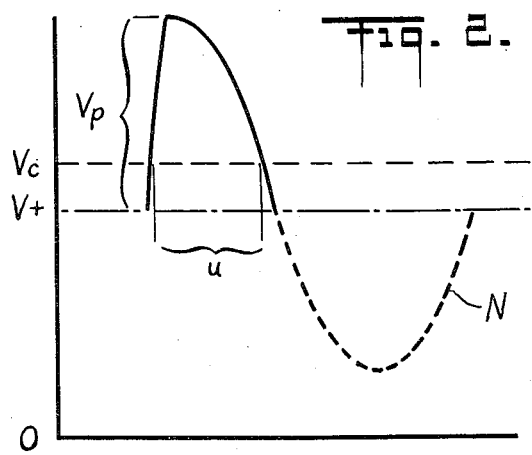
INVENTOR
*James M. Constable*
BY
*Curtis Morris & Safford*
ATTORNEYS United States Patent Office 2,833,931
Patented May 6, 1958

2,833,931

HIGH RANGE RADIATION MEASURING CIRCUIT

James M. Constable, White Plains, N. Y., assignor to Electronic Products Company, Mount Vernon, N. Y.

Application October 31, 1955, Serial No. 543,780

14 Claims. (Cl. 250—83.6)

This invention relates to an improved Geiger-Müller tube circuit for measuring very high intensity penetrating radiation over a very wide range of intensities.

An object of this invention is to provide a portable radiation measuring instrument able to measure accurately high intensity radiation.

Another object is to provide such an instrument which requires only a small amount of power and which can be operated over a number of ranges of measurement with the same high accuracy.

Other objects are to provide such an instrument which is rugged and reliable, which will maintain its accuracy indefinitely, and which can be manufactured at relatively low cost.

The detection and measuring of penetrating radiation is now of great importance to mankind especially where enough radioactive material is concentrated to give off intense radiation. Such radiation, which is not visible and hence gives no warning, can fatally harm a person who happens too near for even a brief instant. Accordingly, it is imperative to provide people who must work with or come in the vicinity of radioactive material with reliable and convenient means for detecting and then for accurately measuring the amount of radiation.

One of the most accurate and satisfactory circuits for measuring penetrating radiation is that using a Geiger-Müller tube. In such a circuit the G–M tube is customarily continuously energized by a high-voltage supply and the radiation is measured by counting the rate that pulses are given off by the tube, the number of these pulses per unit of time being proportional to radiation intensity. This condition is true, however, only so long as the pulses do not occur one after another so fast that the gas in the G–M tube does not have time to de-ionize between pulses, in other words, only so long as radiation intensity is sufficiently low. When the intensity is too high, one pulse within the G–M tube follows another before the tube gas can de-ionize and the tube becomes blocked, i. e. its output pulses are no longer nicely separated and distinct from one another. It then becomes very difficult if not impossible to measure radiation intensity with any accuracy.

A way to overcome this difficulty, with a G–M tube, of blocking when exposed to too much radiation has been found. This way consists of energizing a G–M tube periodically for only short intervals of time. By so doing, the tube is pulsed on and off and de-ionization of its gas between pulses is assured. The accuracy of the measurement of radiation intensity obtained in this way is very good, being a statistical average of the probability of pulses occuring when the tube is on, i. e. energized with enough voltage for operation. In this way, much higher intensity radiation can be measured with a G–M tube than if the tube were energized continuously. The present invention uses this principle of pulsing on and off a G–M tube in a circuit which gives accurate measurements of high intensity radiation and which requires so little power and is so rugged that it is truly portable.

The invention will be understood more clearly and its many advantages appreciated more fully by studying the following description given in connection with the accompanying drawings in which:

Figure 1 is a diagram of a circuit embodying features of the invention; and

Figure 2 shows waveforms and voltage levels for the circuit of Figure 1.

Referring now to Figure 1, the circuit 10 shown herein, and which embodies features of the invention, includes a G–M tube 12 and a suitable metering circuit 14, such as one well known to the art but advantageously one like that disclosed and claimed in the inventor's co-pending application Serial No. 519,544, filing date July 1, 1955. Metering circuit 14 provides a direct current path to ground from the cathode of tube 12. The anode of this tube is connected through inductor 16 (or alternatively, inductor 17 or inductor 18) in parallel with crystal diode 20 and resistor 22 to a positive supply voltage V+. This voltage is made just slightly less than the voltage required to energize tube 12. The tube therefore requires additional anode voltage before it will conduct pulses of current when exposed to penetrating radiation. This additional voltage is supplied at instants, as will appear, by the capacitor 24 (or alternatively, capacitor 25 or capacitor 26) when the cold-cathode gas diode 28 breaks down and conducts. This diode is disclosed and claimed in the inventor's application Serial No. 544,206, filing date November 1, 1955.

Gas diode 28 is connected across potential V+ in series with the charging resistor 30 (or alternatively, resistor 31 or resistor 32). When the voltage across diode tube 28 builds up to its breakdown voltage, for example, 400 volts, the tube suddenly starts to conduct and the voltage across it sharply drops. This immediately connects capacitor 24, which is charged to the breakdown voltage of tube 28, in parallel with inductor 16 and brings the common lead 33 positive relative to voltage V+. Since the positive charge on capacitor 24 cannot flow through inductor 16 at the first instant (current cannot instantaneously change in an inductor) and since it cannot flow through diode 20, this diode being poled for positive current flow in the direction of arrow 34, the voltage on capacitor 24 is added to voltage V+ thereby energizing G–M tube 12. The length of time this tube is energized is determined as will appear, by the oscillation frequency of the tank circuit including inductor 16 in parallel with wiring capacitance, the trimming capacitor 36 and the inter-electrode capacitance of tube 12.

The sudden switching of charged capacitor 24 across inductor 16 sets up electrical oscillation in the tank circuit, this oscillation being allowed to progress for exactly one-quarter cycle. Thus, as seen in Figure 2, at the first instant capacitor 24 is switched, the voltage across inductor 16 becomes Vp and a quarter cycle later it is zero relative to voltage V+. Since the voltage Vp is added to the voltage V+, the voltage Vc required to energize G–M tube 12 is exceeded by a large amount and the tube is energized for the length of time u. This time u will very nearly equal the time for a quarter cycle of oscillation and will remain almost exactly constant for each discharge cycle of capacitor 24 regardless of variations in the amplitude of voltage Vp within a range. Thus, G–M tube 12 will be suddenly switched on for the short, definite time u and then suddenly switched off and the measurement accuracy of the circuit will remain high and substantially constant.

Normally, the voltage across inductor 16 after falling from a positive value to zero would reverse and become negative. However, in the circuit of Figure 1 when the voltage across the inductor starts to go negative, current will flow in the direction of arrow 34 through diode 20 and the stored energy of the tank circuit will be dissipated. The negative cycle of voltage which is clipped by diode 20 is represented by the dotted line N in Figure 2. Since all the energy stored in the tank circuit is dissipated during negative cycle N, the voltage across it will not again go positive until capacitor 24 is once again re-charged and then discharged. The charging rate of capacitor 24 is determined by the size of resistor 30, the resistance of inductor 16 (or inductor 17 or 18) being assumed negligible. This charging rate in turn determines the rate at which gas tube 28 breaks down and hence how often per unit of time the G–M tube 12 is energized by the pulses of voltage $V_p$. The length of time $u$ that tube 12 is energized each time depends on the resonant frequency of the tank circuit including inductor 16. By switching inductor 17 or inductor 18 in circuit instead of inductor 16, this length of time can be changed and the radiation intensity which can be measured, switched from one range to another. To keep the repetition rate of gas tube 28 constant and to keep the amplitude of $V_p$ constant when inductor 16 is replaced by inductor 17 or 18, capacitor 25 or 26 is connected in place of capacitor 24, and resistor 31 or 32, respectively, is switched in circuit instead of resistor 30. In this way, the range of measurement can be multiplied by, say, a factor of ten, but the linearness of measurement and its percent accuracy will not be appreciably affected.

Trimming capacitor 36 has been provided to compensate for small differences in the electrode capacitances of G–M tube and variations in wiring capacitances. Thus the circuit can be re-calibrated after a new tube 12 has been installed simply by adjusting capacitor 36.

The parallel circuit, consisting of resistor 22 and the capacitor 38, in series with crystal diode 20 prevents this diode from conducting in the reverse direction immediately after it has conducted in the direction of arrow 34. Diode 20, because of uncombined holes and carriers in it still present after forward current flow, might otherwise conduct for a brief instant in the reverse direction thereby adversely affecting the operation of circuit 10.

In a circuit substantially the same as that shown in Figure 1 and which has been built and tested, the time $u$ was 0.5 microsecond for a full scale radiation intensity range of 500 R/hr., 5.0 microseconds for 50 R/hr., and 50 microseconds for 5 R/hr. The repetition rate for the pulses $V_p$ was about 1,000 pulses per second and was the same for all three ranges. G–M tube 12 was a type EP–72M manufactured by Electronic Products Co.; gas diode tube 28, type EP–92 manufactured by Electronic Products Co.; V+ was about 680 volts; $V_c$ was about 700 volts; $V_p$ was about 200 volts and was the same for all three ranges; inductor 16 was 2 millihenrys; inductor 17, 35 millihenrys; inductor 18, 10 henrys; capacitor 24, 150 micromicrofarads; capacitor 25, 125 micromicrofarads; capacitor 26, 100 micromicrofarads; resistor 30, 10 million ohms; resistor 31, 11 million ohms; resistor 32, 12 million ohms; capacitor 36, 7 to 45 micromicrofarads; capacitor 38, 2 microfarads; resistor 22, 10,000 ohms; diode 20, type 1N217.

In circuit 10, only a single voltage supply of relatively low voltage need be used and the power supplied by this voltage is efficiently utilized. The operation of the circuit is very stable and the ranges of measurement, once determined, remain accurate to a high degree and linear to the same degree. Even so, only a few simple, inexpensive components need be used and these can be of such small size and ruggedness that the instrument is truly portable.

The above description is intended in illustration and not in limitation of the invention. Various minor changes in the embodiment illustrated may occur to those skilled in the art and these can be made without departing from the spirit or scope of the invention as set forth.

I claim:

1. A portable instrument for accurately measuring very high intensity radiation, said instrument including a radiation-detecting gas-discharge device, supply means to energize said device with a voltage, an inductor connected in series with said supply means and coupled to said device, a capacitor connected in a resistance circuit across said supply means and adapted to receive electric charge therefrom, switch means for connecting periodically said capacitor directly in parallel with said inductor to suddenly change the voltage applied to said device, and energy damping means connected with said inductor to prevent a single charge applied thereto by said capacitor from causing more than one voltage pulse positive in a given direction, whereby said device will be energized by a series of sharp pulses substantially constant in duration and repetition rate.

2. The combination of elements as in claim 1 in which said switch means includes a cold cathode gas diode connected to one end of said inductor and to one end of said capacitor, the other ends of said capacitor and inductor being connected together the breakdown voltage of said gas diode being less than said supply voltage, the supply voltage being just slightly less than enough by itself to energize said radiation detecting device to conduction.

3. The combination of elements as in claim 1 in which said damping means is a crystal diode which is connected in series with a large capacitor shunted by a resistor, said diode and large capacitor in series being connected in parallel with said inductor.

4. An instrument for accurately measuring very high intensity radiation comprising a G–M tube, a metering circuit connected to said tube, means establishing a direct current connection between said tube and a source of high voltage and including an inductor connected in series with said tube and said source, a capacitor connected to one end of said inductor and in series therewith and with said source and with a charging resistor, a gas discharge tube connected in parallel across said capacitor and inductor in series, and clipping means including a current rectifier connected across said inductor and poled for conduction substantially in one direction only, the steady state voltage applied to said G–M tube by said source being less than that needed to energize said G–M tube to conduction, the voltage applied by said source to said gas discharge tube being greater than the breakdown voltage thereof, whereby said G–M tube is energized to conduction by voltages developed periodically across said inductor, the time duration and the repetition rate of these voltages being substantially constant.

5. The combination of elements as in claim 4 in further combination with means for switching the measuring range of said instrument including means for changing the value of said inductor to change the time duration of the voltages developed across the inductor.

6. The combination of elements as in claim 5 in further combination with means to change the values of said capacitor and said charging resistor when the value of said inductor is changed so that the repetition rate and the amplitude of the voltages developed across the inductor will remain approximately the same whereby the range of measurement of said instrument can be changed by a given ratio by changing the duration of these voltages in the same ratio.

7. A portable instrument for accurately measuring very high intensity radiation, said instrument including a G–M tube, a single voltage source connected to said tube and giving an output direct voltage less than that needed to energize said tube to conduction, an inductor connected in series with said tube and said source and arranged so that a pulse of voltage across said inductor which is positive in one direction will add to the output voltage of said single voltage source to enable said tube to conduct, a capacitor connected to said single voltage source and adapted to receive electric charge therefrom, switch means for connecting for a short time periodically at substantially equal intervals said capacitor to said inductor to apply thereacross a positive voltage in said one direction and to permit said inductor to discharge said capacitor with a high current surge, a rectifier connected across said inductor to prevent voltage across it from going appreciably negative in said one direction, and a metering circuit connected to said G–M tube for counting the pulses of current through it caused by incident radiation.

8. The combination of elements as in claim 7 in further combination with an adjustable capacitor connected in parallel across said inductor.

9. The combination of elements as in claim 7 wherein said rectifier is a semi-conductive crystal and in further combination with a large capacitor and a relatively small resistance in parallel and connected in series with said crystal rectifier whereby any tendency of said rectifier to conduct in the reverse direction for a brief instant after conducting in the forward direction is counteracted.

10. The combination of elements as in claim 7 in further combination with range means to change the value of said inductor whereby the "on" time of said G–M tube can be changed in precisely predetermined amount and in further combination with means cooperating with said range means to change the value of said capacitor keeping its charging time constant so that with the change in value of said inductor the repetition rate and amplitude of the pulses of voltage applied to said inductor will remain substantially the same before and after the value of said inductor is changed, whereby the scale factor of the measurement range of said instrument can be changed substantially exactly in relation to the change in value of said inductor and without changing said metering circuit.

11. A portable instrument for accurately measuring very high intensity radiation, said instrument comprising a source of direct voltage, an inductor connected to said source, a G–M tube, and a metering circuit, said inductor, tube and metering circuit being connected in direct current series with said source, the direct voltage applied to said G–M tube being less than that needed to energize it to conduction, a capacitor and a resistor connected in series with said source and said inductor, a cold cathode gas discharge tube connected across said capacitor and inductor in series and having a breakdown voltage less than the direct voltage of said source, and a current rectifier connected across said inductor to keep the voltage thereacross substantially positive in one direction only.

12. The combination of elements as in claim 11 in further combination with means for changing the value of said inductor to change the measuring range of said circuit, and simultaneously for changing the value of said capacitor to keep the amplitude of the pulse generated across said inductor by said capacitor substantially the same for different values of said inductor.

13. The combination of elements as in claim 12 in which said means also simultaneously changes the value of said resistor to keep the repetition rate of the discharging of said capacitor into said inductor constant for different values of said capacitor.

14. A high-range radiation measuring circuit including a G–M tube, a direct voltage source, a metering device coupled to said tube for indicating the occurrence of signals therefrom, an inductor connected to said source, voltage clipping means connected across said inductor, a first capacitor connected in parallel with said inductor, means connecting said inductor to said tube, a gas-discharge diode connected to said inductor, a second capacitor connected to said diode, and means including a resistor connecting said diode to said source, the breakdown voltage of said diode being less than that of said source, said diode being connected to periodically breakdown and thereby generate a sharp pulse of voltage across said inductor, the duration of said pulse being determined by the resonant frequency of said inductor and the capacity in parallel with it.

References Cited in the file of this patent

UNITED STATES PATENTS

| | | |
|---|---|---|
| 2,414,363 | Dietert et al. | Jan. 14, 1947 |
| 2,672,561 | Lichtman | Mar. 16, 1954 |
| 2,706,793 | Alvarez et al. | Apr. 19, 1955 |